United States Patent [19]

Spille

[11] Patent Number: 5,712,920

[45] Date of Patent: Jan. 27, 1998

[54] METHOD FOR THE COMPATIBLE TRANSMISSION AND/OR STORAGE AND DECODING OF AN AUXILIARY SIGNAL

[75] Inventor: Jens Spille, Laatzen, Germany

[73] Assignee: Deutsche Thomson-Brandt GmbH, Villingen-Schwenningen, Germany

[21] Appl. No.: 168,295

[22] Filed: Dec. 17, 1993

[30] Foreign Application Priority Data

Dec. 5, 1992 [DE] Germany .................... 42 41 068.1

[51] Int. Cl.[6] ........................................... H03G 3/00
[52] U.S. Cl. ................................................. 381/104
[58] Field of Search ........................... 381/104, 2, 3, 381/4, 5, 6; 455/232.1, 231

[56] References Cited

FOREIGN PATENT DOCUMENTS

| 209 047 | 1/1987 | European Pat. Off. | G11B 27/19 |
|---|---|---|---|
| 0540330A2 | 10/1992 | European Pat. Off. | H04B 1/66 |
| 523 452 A1 | 1/1993 | European Pat. Off. | G11B 20/10 |
| 540 330 A2 | 5/1993 | European Pat. Off. | H04B 1/66 |
| 1 101 530 | 8/1957 | Germany | H04H 5/282 |
| 33 11 646 | 10/1984 | Germany | H04H 5/00 |
| 33 11 647 | 10/1984 | Germany | H04H 5/00 |
| 33 14 566 | 10/1984 | Germany | H04H 5/00 |
| 73 252 B | 1/1986 | Germany | G11B 20/10 |
| 39 37 515 | 4/1991 | Germany | H04J 15/00 |
| 41118551 | 10/1992 | Germany | H04H 1/00 |
| WO93/15562 | 8/1993 | WIPO | H04B 1/66 |

*Primary Examiner*—Thomas D. Lee
*Assistant Examiner*—Jerome Grant, II
*Attorney, Agent, or Firm*—Joseph S. Tripoli; Eric P. Herrmann

[57] ABSTRACT

A method of simultaneously transmitting and decoding an audio signal and an auxiliary signal which is inseparable from the audio signal includes the step of allocating a loudness level to the audio signal which is higher than the level of the auxiliary signal whereby the auxiliary signal is inaudible during playback of the audio signal and does not deteriorate the playback of the audio signal. The audio signal is encoded by dividing it into a number of frequency bands. The auxiliary signal is transmitted in one of the frequency bands at a level much lower than the level of the audio signal.

7 Claims, 1 Drawing Sheet

METHOD FOR THE COMPATIBLE TRANSMISSION AND/OR STORAGE AND DECODING OF AN AUXILIARY SIGNAL

The invention relates to a method for the compatible transmission and/or storage and decoding of an auxiliary signal in/with a digital audio signal.

PRIOR ART

For many applications, it is required to transmit an auxiliary signal in addition to an audio signal, in such a manner that the auxiliary signal cannot be easily separated from the audio signal but can be separately evaluated and is not audible during the sound reproduction and does not otherwise impair the subjective quality of the sound reproduction. In DE-A-3806411, an auxiliary signal is added or transmitted within a frequency group of the audio signal at a level which, compared with the respective level of the audio signal in this frequency group, is so low that it is not audible during the reproduction due to psycho-acoustic masking effects. However, it has been found in this connection that the transmission of the auxiliary signals within a frequency group together with the audio signals is extremely cumbersome and susceptible to errors.

INVENTION

The invention is based on the object of avoiding these disadvantages and specifying a method for transmitting and storing a digital audio signal and a digital auxiliary signal which is compatible to the previously proposed standard audio coding method.

The invention is based on the following consideration: according to the MPEG audio standard (ISO/IEC Coding of Moving Pictures and Associated Audio) for coding audio signals (and other coding methods), a digital audio signal is divided into a number of frequency bands (subbands) before the coding and these bands are separately coded. In the bit stream of the digitized audio signal, a bit allocation information item is arranged which informs a decoder of the number of bits which are allocated per subband. Furthermore, there is a scale factor information item which defines the loudness of the subband.

If then 16 bits are allocated as number of samples to a particular subband, for example the highest band with respect to frequency (SB limit) via the bit allocation information item and, at the same time, the loudness of these samples is set to −118 dB via the scale factor information item, a virtually inaudible data channel is produced in this case. This additional channel can advantageously be variably adapted every 24 ms and can accommodate data of all types, even other audio data, for example voice. This, in practice, creates an auxiliary data channel with a capacity of 48,000 samples/s/32 subbands * 16 bits/subband =24 kbit/s, which is virtually inseparably connected to the digital audio signal with respect to an MPEG data stream. In MPEG, other subband numbers, for example 27, can also be used, depending on mode, in which case a number of subbands can also be utilized for transmitting the auxiliary signal. Corresponding error protection can be additionally carried out depending on the transmission medium.

The advantage of the transmission method according to the invention consists, on the one hand, in that it is compatible with the above-mentioned MPEG audio standard. The invention makes use of the finding that audio signals at the highest frequencies are barely perceived by a listener, or not at all, especially if the enjoyment of music is in any case adversely affected by interfering external noise as in a vehicle.

According to the invention, this not only creates another transmission channel in the MPEG bit stream but this channel is also arranged hidden in the audio signal bit stream and can thus only be removed with difficulty or not unintentionally. This auxiliary-data transmission channel can therefore be used for identification or control purposes of all types, particularly also as decoding block or as channel for controlling dynamic functions in the audio signal (for example variable dynamic range adjustable in the receiver analogously to the proposals for introducing a variable dynamic range in SM broadcasting, made by the institut für Rundfunktechnik, Munich).

The invention can also be implemented in the case of storage on a storage medium in that a corresponding auxiliary-data memory is allocated to a memory.

In principle, the method according to the invention consists in a compatible transmission and/or storage and decoding of an auxiliary signal within an audio signal, which is not audible during the reproduction of the audio signal and can be evaluated separately from the audio signal, a loudness information item being allocated to the audio signal, and in which:

the audio signal and the auxiliary signal are digital and, due to the loudness information item, which can be a scale factor information item and has a fixed value, the level of the auxiliary signal is lowered during the reproduction of the audio signal, in such a manner that the auxiliary signal is not audible;

in the case of subband-encoded audio signals, the auxiliary signal is transmitted and/or stored in a subband—particularly that for the highest frequencies—instead of the corresponding audio signal component, a bit allocation information item also being allocated to the combined audio signal, at least for the auxiliary signal, and the auxiliary signal being recovered from the combined audio signal with the aid of this bit allocation information item during the decoding;

in the case of broad band-encoded audio signals, the auxiliary signal is transmitted and/or stored and respectively decoded in modulation gaps in the audio signal.

Advantageous further developments of the method according to the invention are found in the associated dependent claims.

DRAWINGS

Illustrative embodiments of the invention are described with reference to the drawings, in which.

ILLUSTRATIVE EMBODIMENTS

Figure 1:
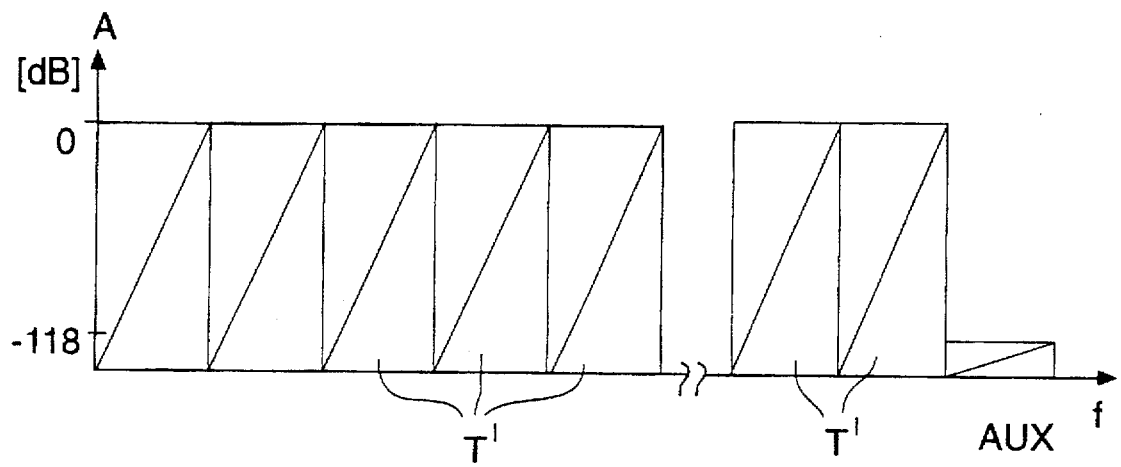
FIG. 1 shows frequency bands of an audio signal.

FIG. 1 shows the frequency bands for a digital audio signal TORG. This audio signal consists of the audio signal T' in which, compared with TORG, for example the frequency band with the highest frequency has been clipped, and of the auxiliary signal AUX, which is transmitted instead of the frequency with the highest frequency of TORG. The amplitudes in the frequency bands of T' can extend up to 0 dB (full amplitude). The maximum amplitude of the auxiliary signal AUX is limited, for example to −118 dB.

Figure 2:
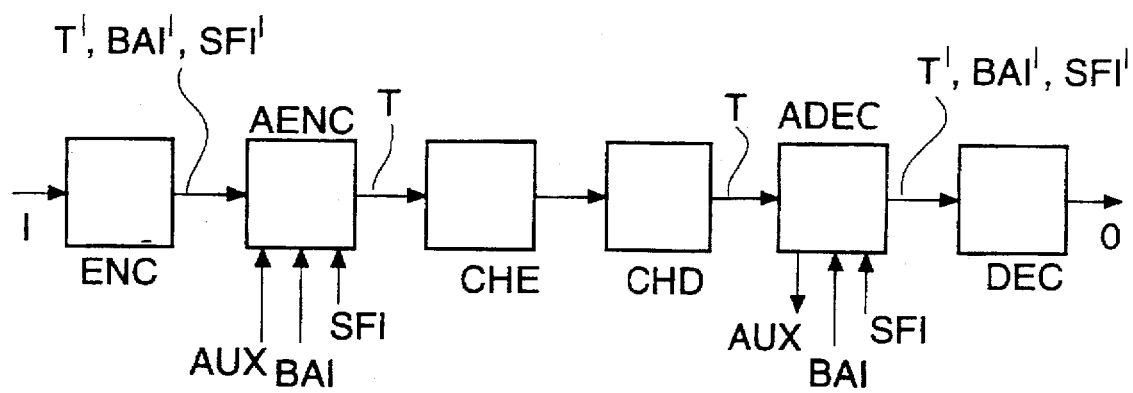
FIG. 2 shows a block diagram of an auxiliary-signal transmission system according to the invention.

In FIG. 2, an input signal I (corresponding to TORG) is encoded in a digital encoder ENC and a digital audio signal T', a bit allocation information item BAI' and a scale factor information item SFI are output serially or in parallel. These output signals pass via an auxiliary-signal encoder AENC as total audio signal T, together with a modified bit allocation information item and a modified scale factor information item, to a channel encoder CHE which carries out channel modulation and, if necessary, adds error protection, and the output signal of which is transmitted or stored.

A subsequent channel decoder CHD handles the channel demodulation and any error correction. The output signal passes via an auxiliary-signal decoder ADEC to a digital decoder DEC which again provides the decoded audio signal 0. CHE and CHD are known circuits which contain, for example, an 8/10 (de)modulation. The auxiliary-signal encoder AENC redetermines the values BAI and SFI for the frequency band allocated to the auxiliary signal AUX (see above-mentioned value examples) and inserts the auxiliary signal AUX at the corresponding place in the data stream. The auxiliary-signal decoder ADEC has the inverse function of AENC and separates the auxiliary signal AUX from the total data stream.

Commercially available devices or PC boards can be used for ENC and DEC:

Telos Zephyr, ISO/MPEG Layer-III transceiver, Telos Systems, Cleveland, Ohio, US;

MusicTAXI Type 3, ISO/MPEG Layer-II and/or-III encoder/decoder, System Engineering GmbH, Ludwigsburg, DE;

PC LAYER-III Card, Fraunhofer-Gesellschaft, DE.

FIG. 2 shows AENC and ADEC as down-stream or upstream units. In fact, these circuits are components of ENC and respectively DEC, ENC supplying the signal T together with the modified bit allocation information item and the modified scale factor information item and DEC receiving these signals.

The invention can also be used in the PASC coding of Philips and in the ATRAC coding of Sony and in DAB, DCC and MiniDisc.

In broad band encoding methods such as, for example, NICAM, the invention can be used in modulation gaps of the digital audio signal. The bit allocation information item and its evaluation can then be omitted.

In general, the invention can be used wherever information is available in the form of mantissa/associated exponent and a low-level auxiliary signal does not have any disturbing effects. BAI then corresponds to the accuracy of the mantissa and SFI to the exponent.

I claim:

1. A method of simultaneously transmitting an audio signal and an auxiliary signal, said auxiliary signal being inseparable from said audio signal, said method comprising the steps of:

providing respective audio and auxiliary signals;

dividing said audio signal into a number of subbands, and encoding respective said sub-bands;

allocating a loudness information scale factor to said subbands indicative of relative loudness at which corresponding subbands are to be reproduced when decoded;

inserting said auxiliary signal in one of said subbands;

establishing said scale factor corresponding to the subband in which said auxiliary signal is inserted, such that said auxiliary signal when reproduced in decoded said audio signal, will be reproduced at an inaudible amplitude, and transmitting digitally encoded combined audio and auxiliary signal.

2. The method of claim 1 wherein said auxiliary signal is transmitted in one of the higher subbands.

3. The method of claim 1 further including a step of including a bit allocation item in said digitally encoded combined audio and auxiliary signal and a decoding step of utilizing said bit allocation item to locate and decode said auxiliary signal from said audio signal.

4. The method of claim 1 further including a step of including a bit allocation item in said digitally encoded combined audio and auxiliary signal for use in decoding said auxiliary signal from said audio signal.

5. The method set forth in claim 1 wherein the step of inserting said auxiliary signal in one of said subbands, substitutes said auxiliary signal for any audio signal in said one of said subbands.

6. A receiver for recovering encoded digital audio signal including an auxiliary signal, said encoded digital audio signal being encoded in subbands with corresponding indicia determinative of relative loudness levels at which corresponding subband information is to be reproduced, said auxiliary signal being inserted in one of said subbands with corresponding indicia, and said signal further including a bit allocation item indicative of the location of said auxiliary signal in said encoded digital audio signal, said receiver comprising:

a source of said encoded digital audio signal including an auxiliary signal;

a decoder, responsive to said encoded digital audio signal including said auxiliary signal for decoding said digital audio signal including said auxiliary signal, said decoder including means responsive to said indicia to render said auxiliary signal inaudible in reproduced said audio signal;

an auxiliary signal decoder, responsive to said encoded digital audio signal including said auxiliary signal, for decoding said auxiliary signal, said auxiliary signal decoder including means responsive to said bit allocation item for determining the location of said one of said subbands containing said auxiliary signal and separating and decoding said auxiliary signal contained in said one of said subbands within said digital audio signal including said auxiliary signal.

7. The receiver set forth in claim 6 wherein said auxiliary signal decoder is responsive to said bit allocation item to determine a one of said subbands which contains said auxiliary signal.

* * * * *